United States Patent
Liao (10) Patent No.: US 8,500,153 B2
(45) Date of Patent: Aug. 6, 2013

(54) FOLDING JOINT OF GOLF BAG CART

(75) Inventor: Gordon Liao, Tainan (TW)

(73) Assignee: Unique Product & Design Co., Ltd., Tainan (TW)

( * ) Notice: Subject to any disclaimer, the term of this patent is extended or adjusted under 35 U.S.C. 154(b) by 3 days.

(21) Appl. No.: 13/271,411

(22) Filed: Oct. 12, 2011

(65) Prior Publication Data

US 2013/0093165 A1 Apr. 18, 2013

(51) Int. Cl.
*A63B 55/08* (2006.01)
*B62B 3/02* (2006.01)

(52) U.S. Cl.
USPC .................... 280/651; 280/47.26; 280/DIG. 6

(58) Field of Classification Search
USPC ............... 280/638, 639, 651, 655, 652, 654, 280/646, 645, 62, 47.16, 47.2, 47.21, 47.22, 280/47.26, 47.27, 47.23, 47.17, 47.34, 47.371, 280/47.18, DIG. 6
See application file for complete search history.

(56) References Cited

U.S. PATENT DOCUMENTS

| | | | | | |
|---|---|---|---|---|---|
| 5,620,272 | A | * | 4/1997 | Sheng | 403/96 |
| 5,765,857 | A | * | 6/1998 | Hsiao | 280/646 |
| 5,857,684 | A | * | 1/1999 | Liao et al. | 280/40 |
| 6,827,366 | B1 | * | 12/2004 | Wu | 280/651 |
| 7,048,296 | B1 | * | 5/2006 | Wu | 280/651 |
| 7,866,685 | B2 | * | 1/2011 | Liao | 280/651 |
| 2003/0132613 | A1 | * | 7/2003 | Lin | 280/651 |
| 2011/0316258 | A1 | * | 12/2011 | Lin | 280/651 |

* cited by examiner

*Primary Examiner* — John Walters
*Assistant Examiner* — Brian Swenson
(74) *Attorney, Agent, or Firm* — Alan Kamrath; Kamrath IP Lawfirm, P.A.

(57) ABSTRACT

A folding joint of a golf bag cart includes a main body fixed onto a cart frame and having a chamber formed inside the main body and a long slot formed on both sides of the chamber separately. A driving block is installed in the chamber of the main body. A spring installed at an upper end of the driving block, and a latch rod is disposed on both sides of the driving block separately. Two rotating members, each has an upper end coupled to the cart frame, a lower end coupled to the main body, and a slide slot with a latch slot formed on the slide slot. Thus, the folding joint can be folded or unfolded to secure the cart frame automatically, to provide a simple and convenient operation.

6 Claims, 11 Drawing Sheets

FOLDING JOINT OF GOLF BAG CART

BACKGROUND OF THE INVENTION

1. Field of the Invention

The present invention relates to a folding joint of a golf bag cart and, more particularly, to the folding joint capable of securing a cart frame when the golf bag cart is folded or unfolded, to provide a simple and convenient operation.

2. Description of the Related Art

In Taiwan, R.O.C. Patent No. M385383, entitled "Golf bag cart folding device", upper and lower cart frames and a rear wheel can be folded synchronously to achieve the effect of providing a convenient operation. A a folding joint is installed at a rotating member of the upper cart frame, a latch switch is provided for releasing the folding joint while turning the upper cart frame, and a link rod set is linked with a rear wheel stand. Thus, the upper and lower cart frames and the rear wheel can be unfolded or folded synchronously. Then, the folding joint is secured to lock the upper and lower cart frames with each other. During the folding or unfolding operation, it is necessary to release the folding joint for the operation, and, thus, the operation is still inconvenient and requires further improvements.

SUMMARY OF THE INVENTION

Therefore, it is a primary objective of the present invention to provide a folding joint capable of securing a cart frame automatically when the golf bag cart is folded or unfolded, to provide a simple and convenient operation.

To achieve the foregoing objective, the present invention provides a folding joint comprising a main body, fixed onto a cart frame, and having a chamber formed inside the main body and a long slot formed on both sides of the chamber separately. A driving block is installed in the chamber of the main body. A spring is installed at an upper end of the driving block, and a latch rod is disposed on both sides of the driving block separately. Two rotating members each has an upper end coupled to the cart frame, a lower end coupled to the main body, and a slide slot with a latch slot formed on the slide slot. Thus, the folding joint can be folded or unfolded to secure the cart frame automatically, to provide a simple and convenient operation.

DETAILED DESCRIPTION OF THE PREFERRED EMBODIMENTS

The technical characteristics, structures and effects of the present invention will become apparent with the detailed description of two preferred embodiments together with the illustration of related drawings as follows.

Figure 1:
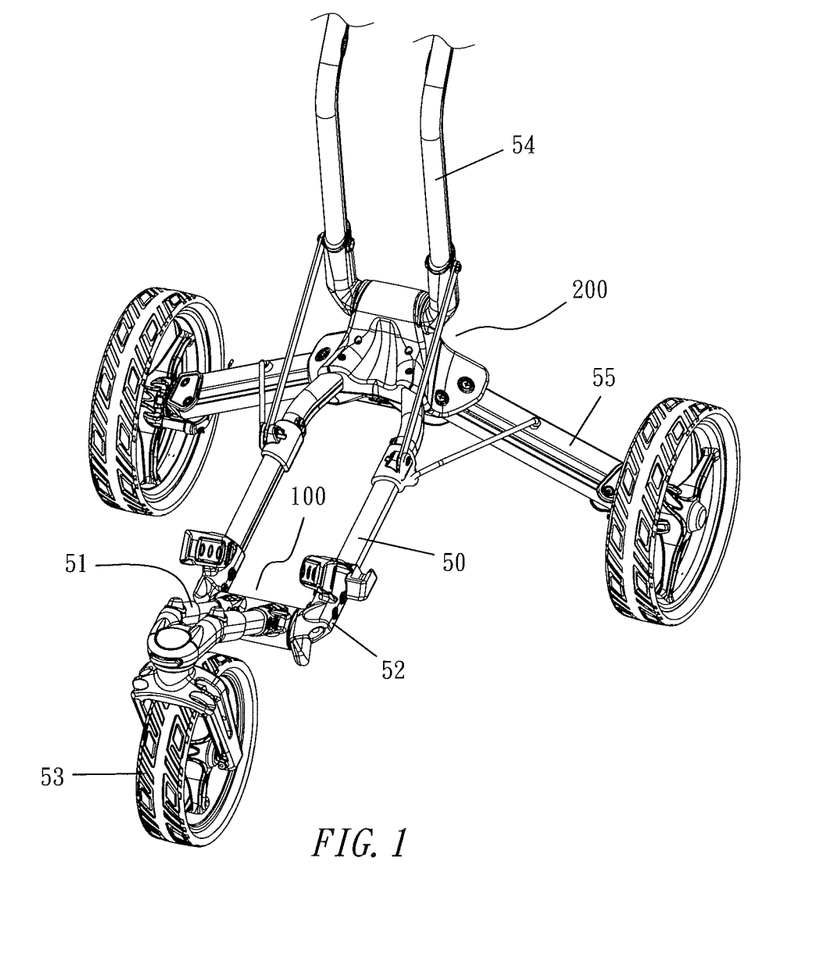
FIG. 1 is a perspective view of a folding joint applied to a golf bag cart in accordance with the present invention.

With reference to FIG. 1 for a perspective view of a folding joint applied to a golf bag cart in accordance with the present invention, the folding joint can be installed between a lower cart frame and a front wheel stand, and between upper and lower cart frames.

Figure 2:
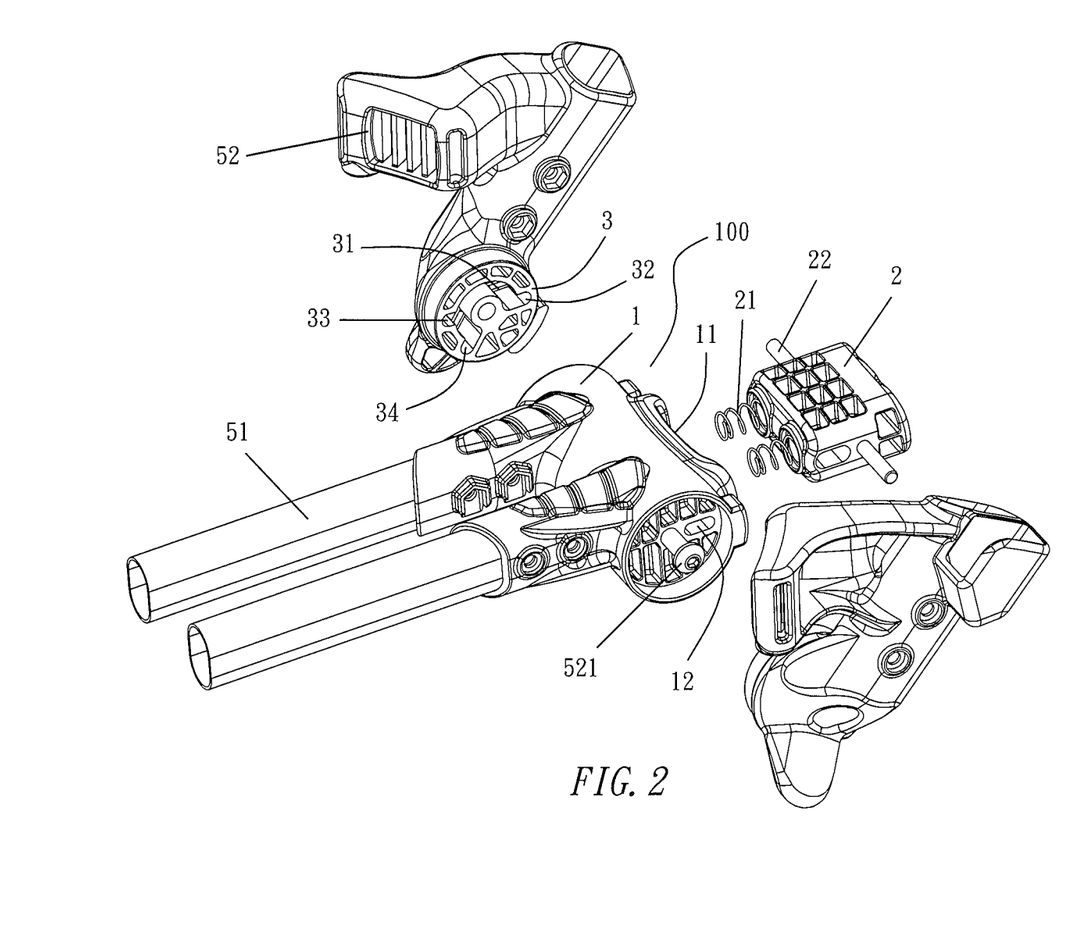
FIG. 2 is an exploded view of a folding joint of a front wheel in accordance with the present invention.
Figure 3:
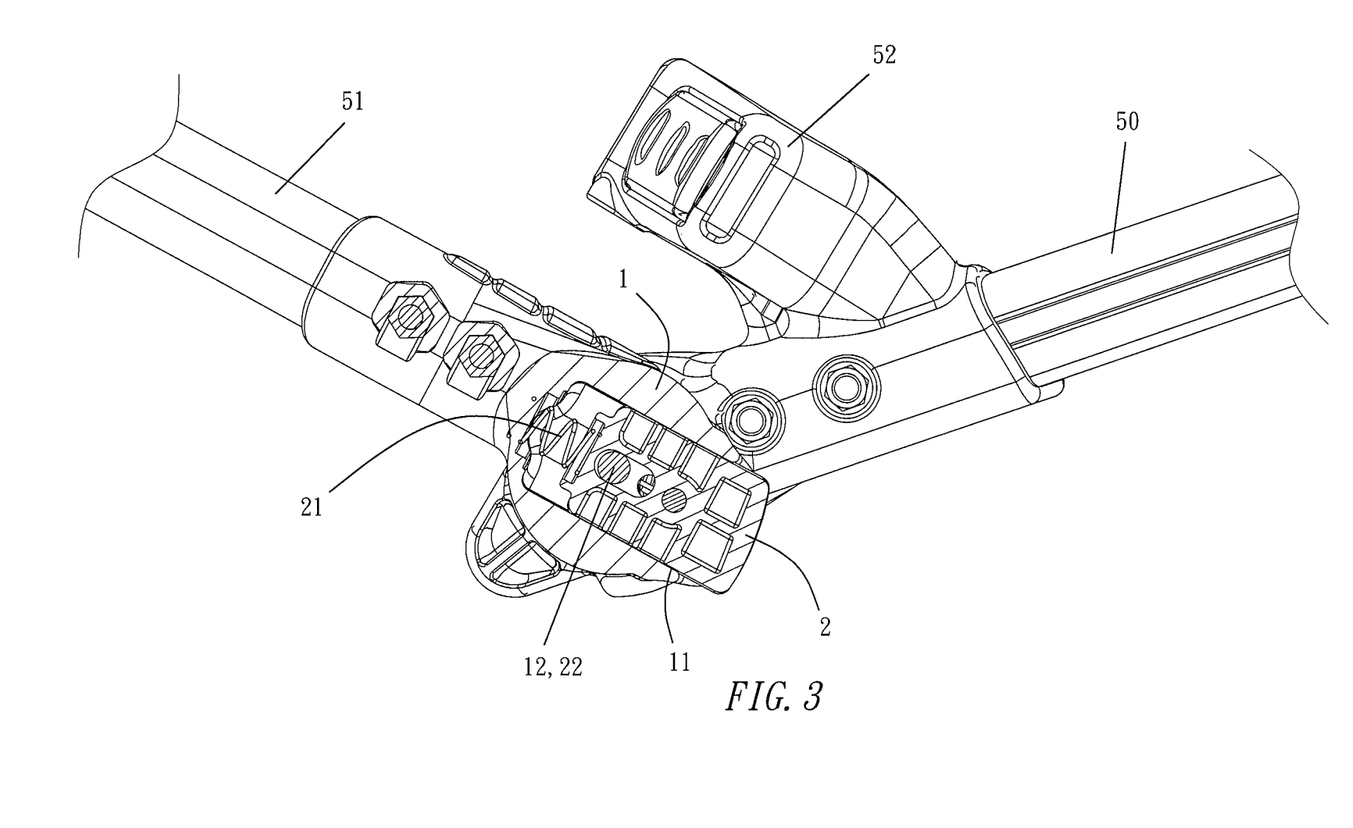
FIG. 3 is a cross-sectional view of a folding joint of a front wheel in accordance with the present invention.
Figure 4:
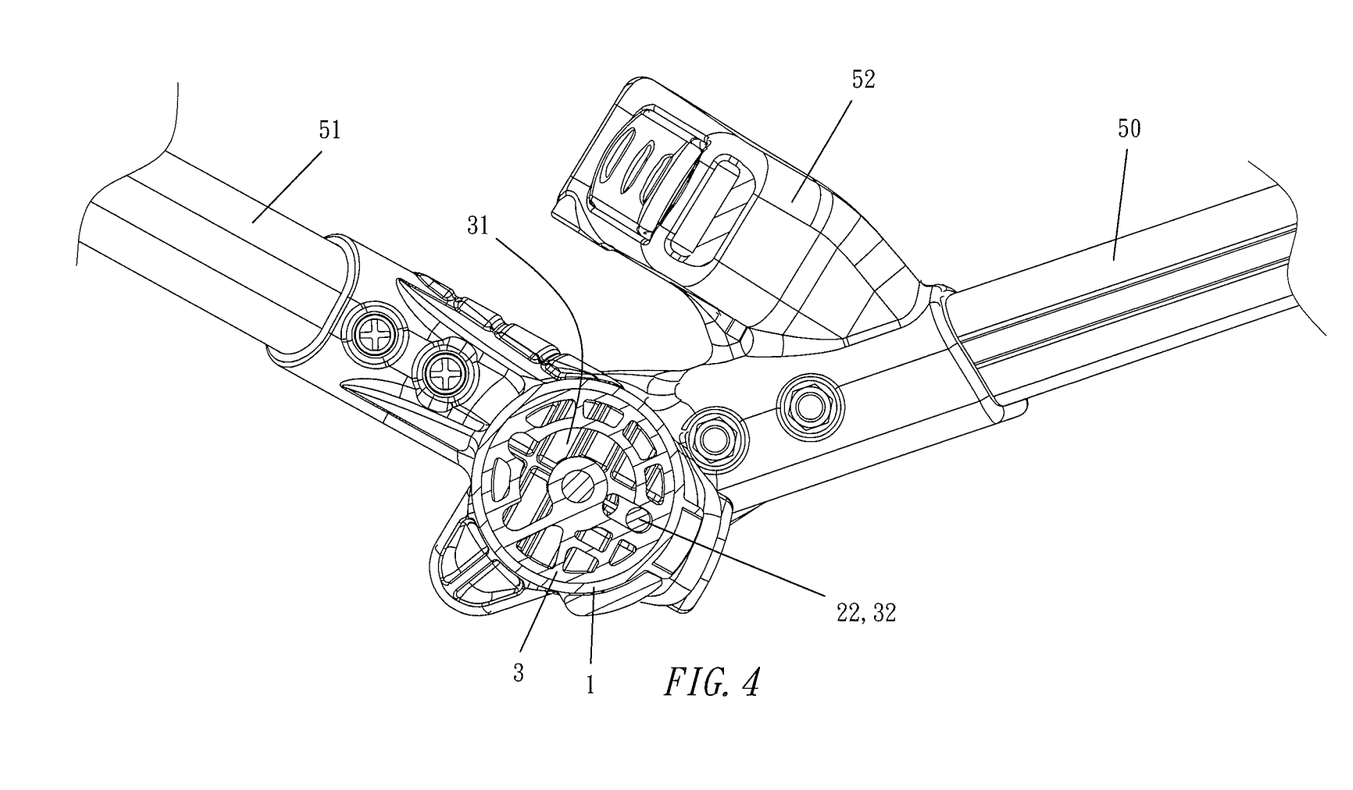
FIG. 4 is another cross-sectional view of a folding joint of a front wheel in accordance with the present invention.

In a preferred embodiment, a front wheel folding joint 100 is installed between the lower cart frame and the front wheel stand as shown in FIGS. 2 to 4. The front wheel folding joint 100 is mounted onto the lower cart frame 50 and coupled to the front wheel stand 51 and axially coupled to a shaft 521 of a golf bag seat 52. The first wheel folding joint 100 comprises: a main body 1, fixed onto a cart frame and having a front end coupled to the front wheel stand 51, a chamber 11 formed inside the main body, and a long slot 12 formed on both sides of the chamber 11 separately. A driving block 2 is installed in the main body 1. A spring 21 is installed at top of the inside of the driving block 2, and a latch rod 22 being is situated in the long slot 12. Two rotating members 3 each has a lower end coupled to the main body 1 and having has a slide slot 31 corresponding to the long slot 12 (or the latch rod 22). The slide slot 31 has first, second and third latch slots 32, 33, 34 and an upper end coupled to the lower cart frame 50 and the golf bag seat 52.

Figure 5:
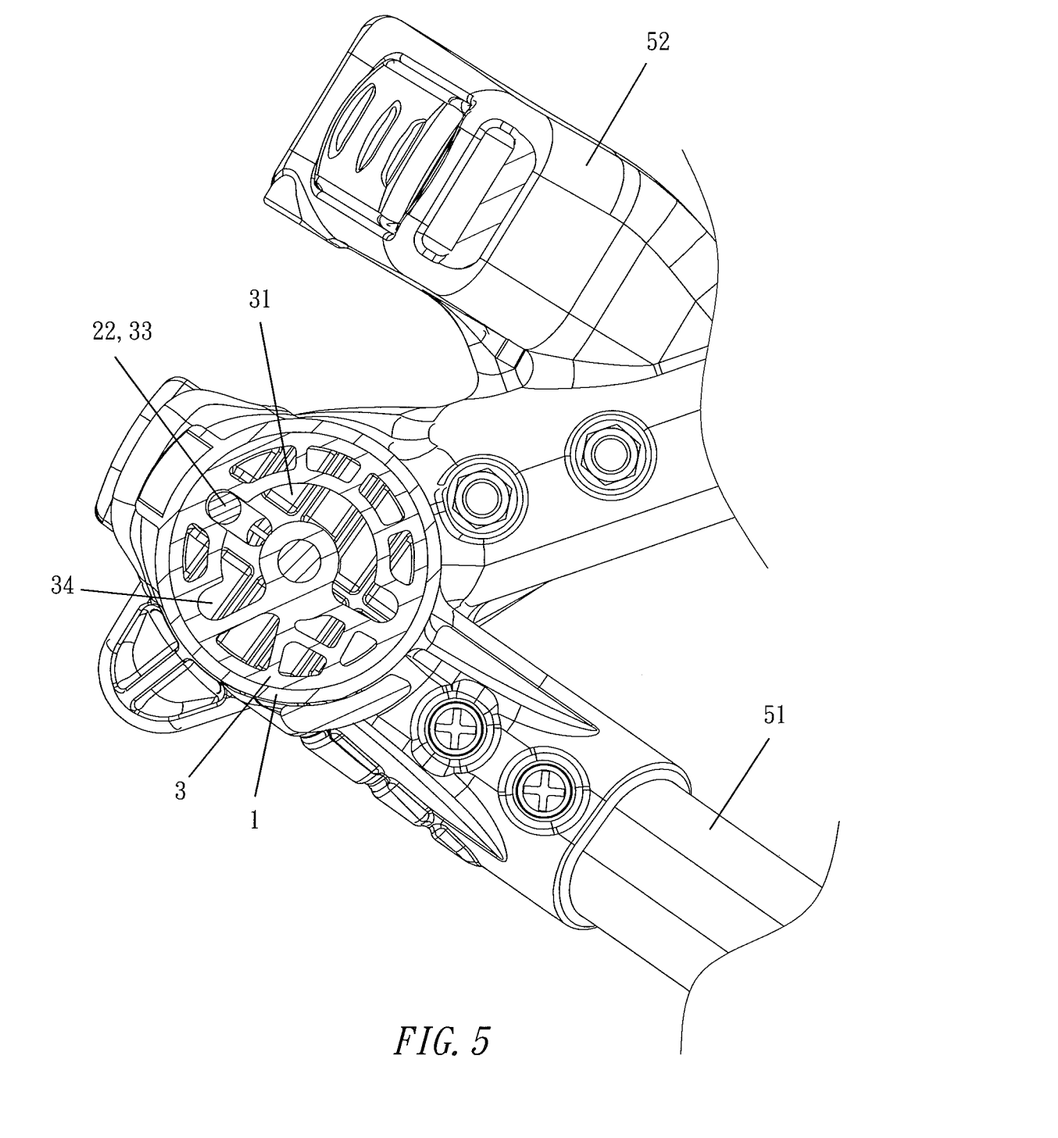
FIG. 5 is a schematic view of folding a folding joint of a front wheel in accordance with the present invention.
Figure 6:
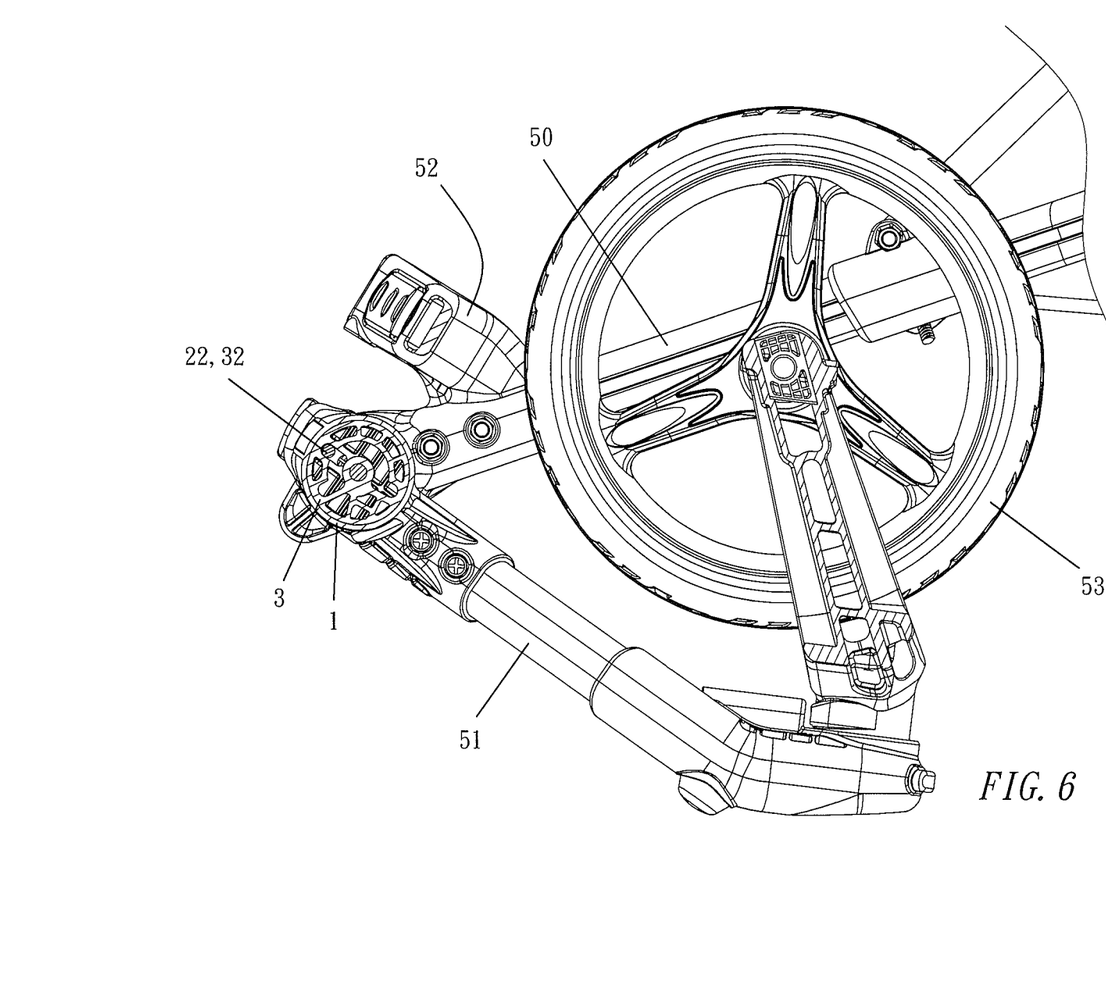
FIG. 6 is another schematic view of folding a folding joint of a front wheel in accordance with the present invention.

With the aforementioned structure, when the cart frame of the present invention is unfolded as shown in FIGS. 3 and 4, the latch rod 22 of the driving block 2 is latched into the first latch slot 32 of the rotating member 3, and maintained by the tension of the spring 21. If it is necessary to fold the golf bag cart, the driving block 2 is pressed (while compressing the spring 21), so that the latch rod 22 is removed from the first latch slot 32 into the slide slot 31. Now, the front wheel 53 (or the front wheel stand 51) is turned to drive the latch rod 22 to remove in the slide slot 31, and the resilience of the spring 21 pushes the latch rod 22 into the second latch slot 33, so that the front wheel 53 is retracted backward and positioned automatically at a folded angle as shown in FIGS. 5 and 6.

In the aforementioned operation, the front wheel 53 can be removed in advance. Then, the front wheel stand 51 is turned to drive the latch rod 22 to remove in the slide slot 31, and latched into the third latch slot 34 to further reduce the storage volume. However, this operation is usually adopted by manufacturers for making shipments, and end users seldom have the chance of using it. Thus, this operation will not be described here.

On the other hand, if it is necessary to unfold the golf bag cart, the driving block 2 is pressed, so that the latch rod 22 is removed from the second latch slot 33 into the slide slot 31. Then, the front wheel 53 (or front wheel stand 51) is turned to drive the latch rod 22 to remove in the slide slot 31, so that the latch rod 22 is moved back into the first latch slot 32 by the resilience of the spring 21, and the front wheel 53 is turned forward and positioned automatically at the unfolded angle as shown in FIGS. 3 and 4.

From the description above, the front wheel folding joint 100 can be used for positioning and securing the front wheel 53 automatically when the front wheel 53 of the present invention is folded or unfolded, without requiring the conventional operation of pressing a latch for the fixation. Thus, the invention provides a simpler and more convenient operation than the prior art.

Figure 7:
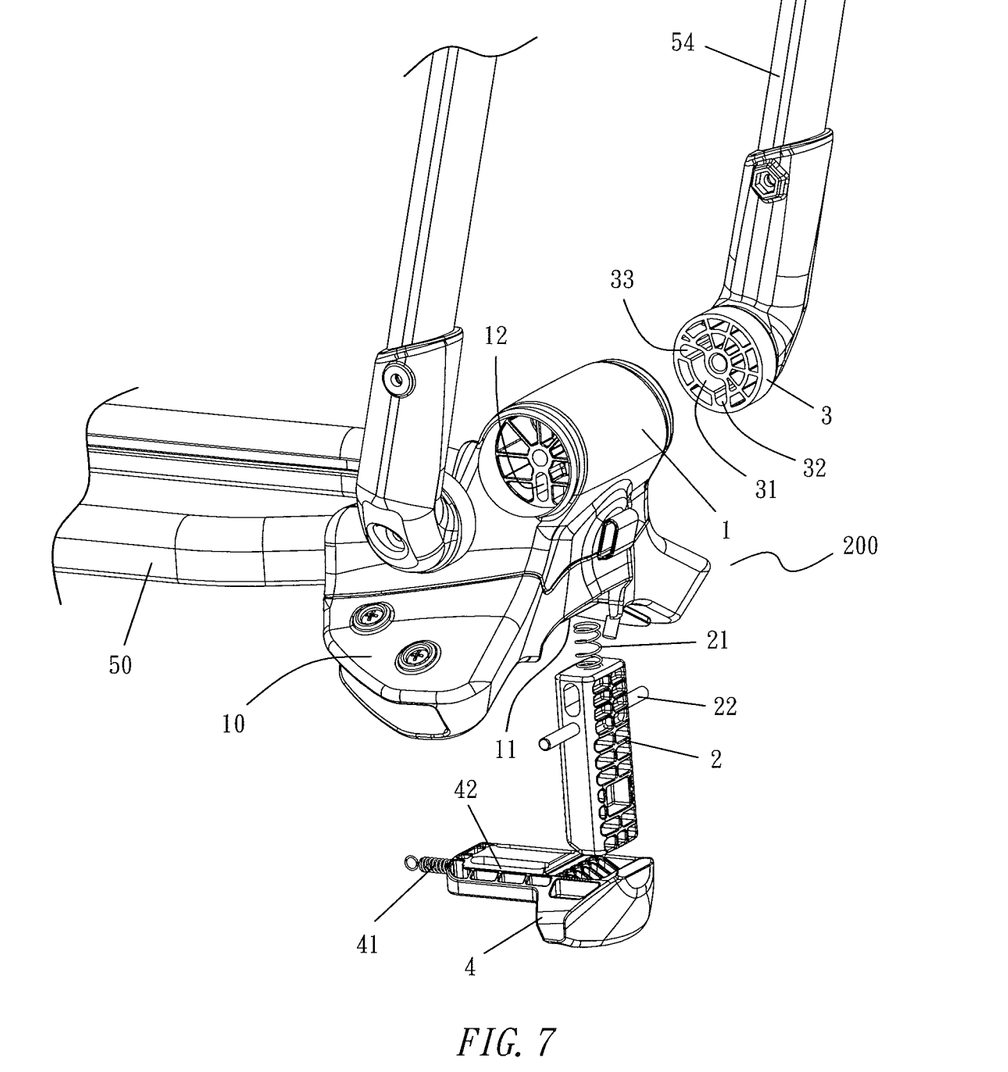
FIG. 7 is an exploded view of a folding joint of the present invention.
Figure 8:
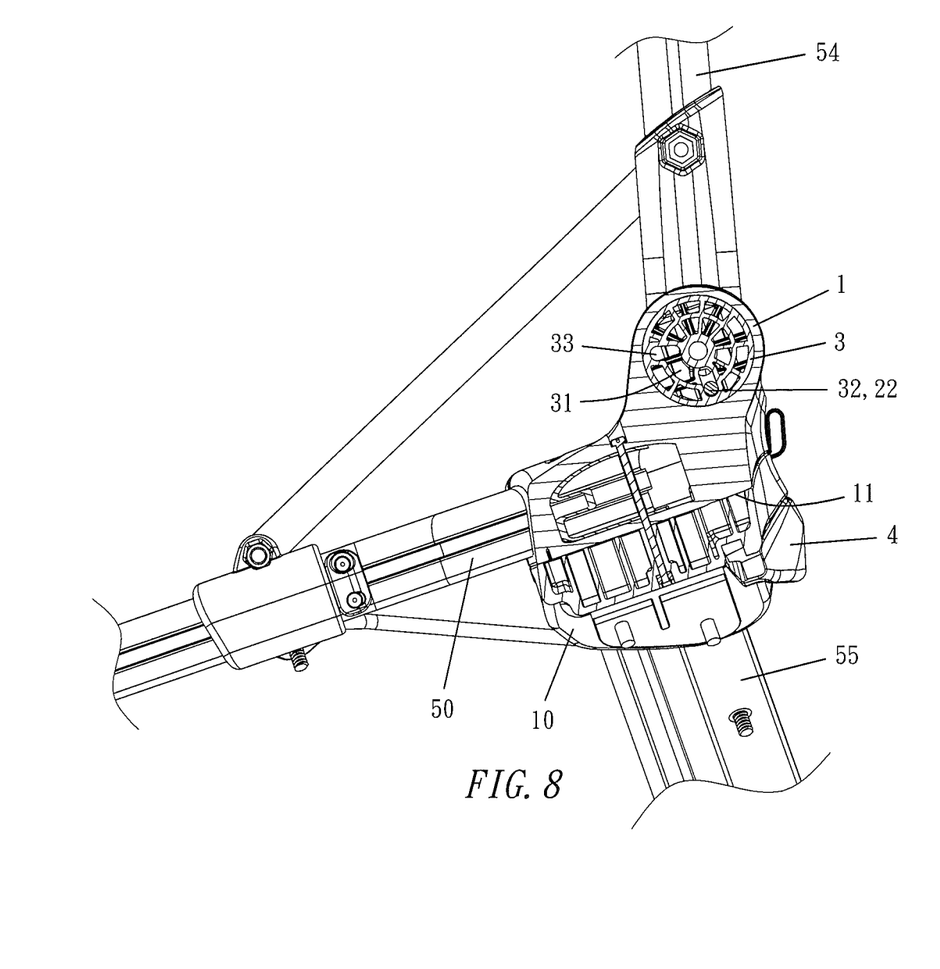
FIG. 8 is a cross-sectional view of a folding joint of the present invention.
Figure 9:
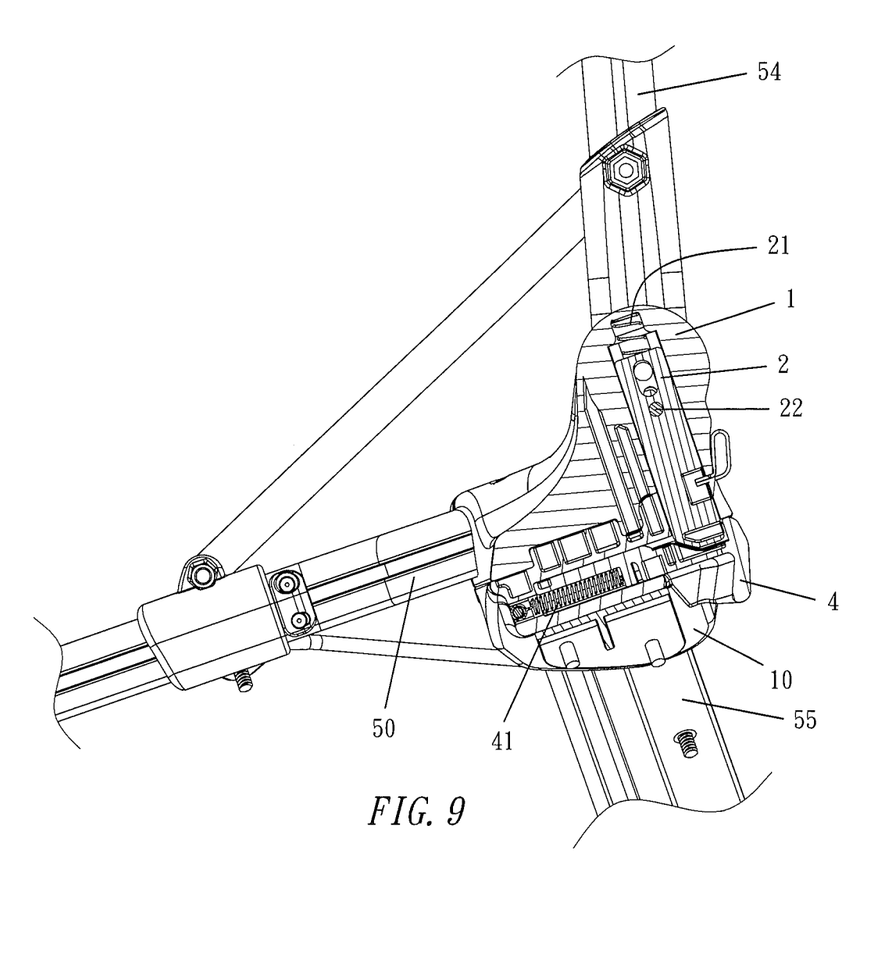
FIG. 9 is another cross-sectional view of a folding joint of the present invention.

In another preferred embodiment, a folding joint 200 is installed between upper and lower cart frames 54, 50 as shown in FIGS. 7 to 9. The folding joint 200 comprises a main body 1 fixed onto a cart frame, or combined and fixed to a connecting plate 10. The connecting plate 10 is coupled to a lower cart frame 50 and a rear wheel stand 55. The main body 1 has a chamber 11 formed therein, and a long slot 12 formed on both sides of the chamber 11 separately. A driving block 2 installed in the chamber 11 of the main body. A spring 21 is installed at an upper end inside the driving block 2, and a latch rod 22 disposed in the long slot 12. Two rotating members 3 each has the bottom coupled to the main body 1, and having has a slide slot 31 corresponding to the long slot 12 (or the latch rod 22). The slide slot 31 having has first and second latch slots 32, 33, and an upper end is coupled and fixed to an upper cart frame 54. A pull handle 4, installed in the main body 1, is situated at the bottom of the driving block 2. A spring 41 is installed therein. An end of the spring 41 is fixed to the main body 1, and the other end of the spring 41 being fixed inside the pull handle 4. An oblique surface 42 is formed at an upper end of the pull handle 4.

Figure 10:
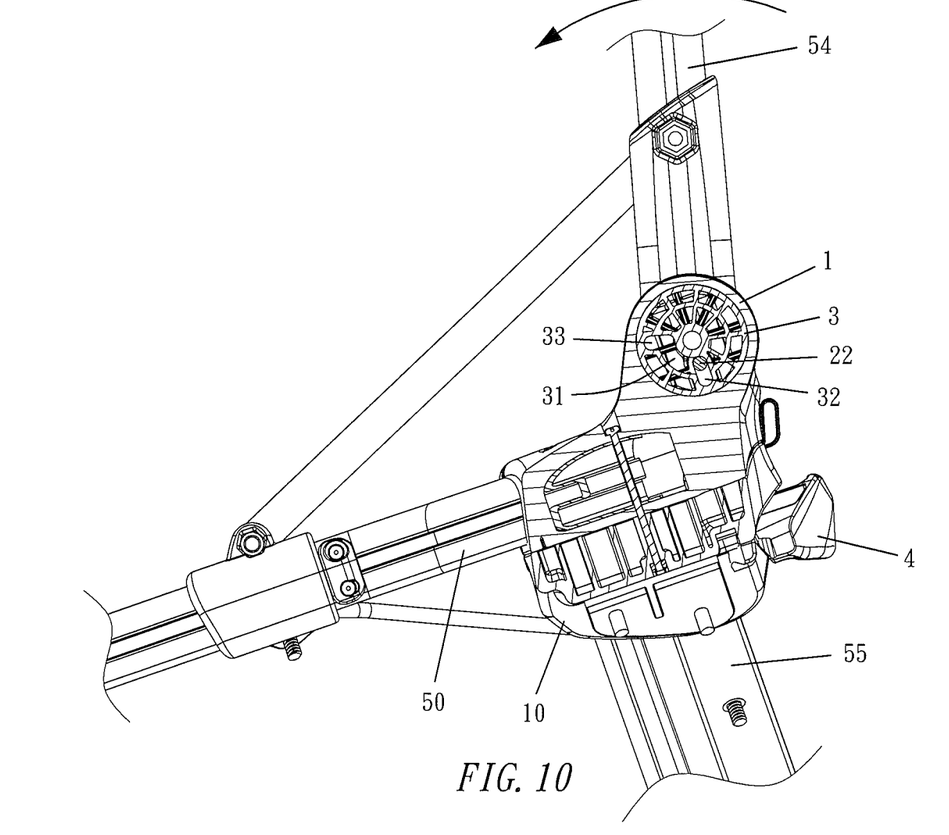
FIG. 10 is a schematic view of folding an upper folding joint of the present invention.
Figure 11:
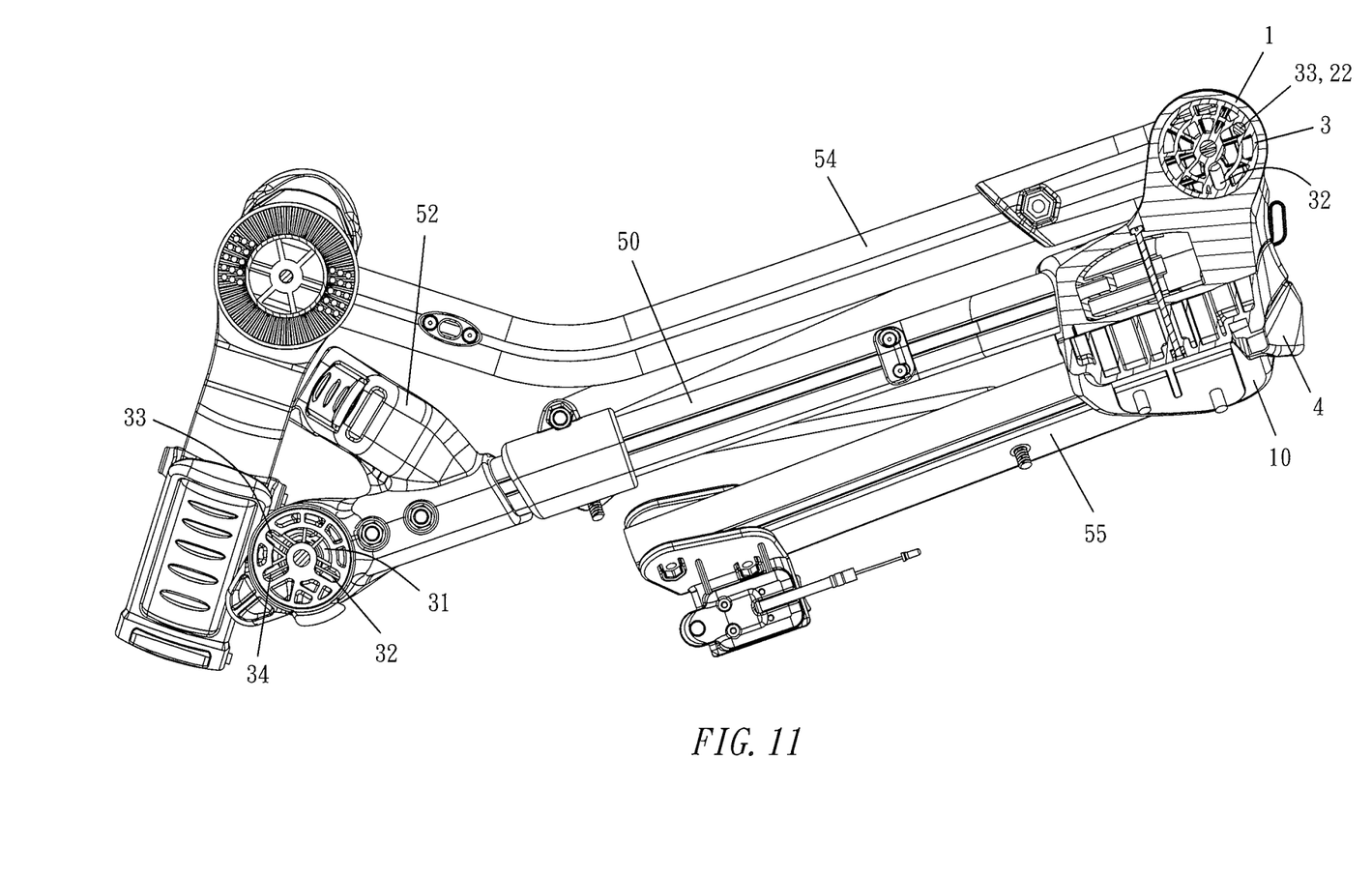
FIG. 11 is another schematic view of folding an upper folding joint of the present invention.

According to the aforementioned structure, if it is necessary to fold the golf bag cart, the driving block 2 is pressed, or the pull handle 4 is pulled to drive the driving block 2 to slide through the oblique surface 42 to remove the latch rod 22 from the first latch slot 32 into the slide slot 31, and the upper cart frame 54 is turned to rotate the rotating member 3 while driving the slide slot 31 to remove, and the resilience of the spring 21 pushes the latch rod 22 into the second latch slot 33, so that the cart frame is fixed automatically at the folded angle as shown in FIGS. 10 and 11. Now, the pull handle 4 resumes its original position by the tension of the spring 41.

On the other hand, if it is necessary to unfold the golf bag cart, the driving block 2 is pressed, or the pull handle 4 is pulled to drive the driving block 2 to slide through the oblique surface 42 to remove the latch rod 22 from the second latch slot 33 into the slide slot 31. Then, the cart frame (or the upper cart frame 54) is turned to rotate the rotating member 3 and drive the slide slot 31 to move, so that the latch rod 22 is latched into the first latch slot 32 by the resilience of the spring 41. The cart frame (or the upper and lower cart frames 54, 50 and the rear wheel stand 55) is positioned automatically to an unfolded angle as shown in FIGS. 8 and 9. Now, the pull handle 4 resumes its original position automatically by the tension of the spring 41.

From the description above, the cart frames including the upper and lower cart frames 50, 54 and the rear wheel stand 55 can be positioned and secured by the upper folding joint 200 during the unfolding or folding operation without requiring the conventional operation of pressing a latch for the fixation. Thus, the invention provides a simpler and more convenient operation than the prior art.

In summation of the description above, the present invention achieves the expected objectives and effects.

What is claimed is:

1. A folding joint of a golf bag cart, comprising:
   a main body having a chamber formed inside the main body and a long slot formed on both sides of the chamber separately and having a first end and a second end;
   a driving block installed in the chamber of the main body;
   a spring installed at an upper end of the driving block;
   a latch rod disposed on both sides of the driving block separately and slideable in the long slots, with the spring biasing the driving block to move the latch rods in a direction generally perpendicular to the latch rods from the first end to the second end of the long slots; and
   two rotating members each having an upper end, a lower end coupled to the main body, and a slide slot, with a first latch slot in communication with the slide slot, with the latch rods slideable into and from the first latch slots from and into the slide slots with slideable movement of the latch rods between the first and second ends of the long slots.

2. The folding joint of a golf bag cart as recited in claim 1, wherein the main body is disposed at a front end of a front wheel stand, and wherein the two rotating members are coupled to a golf bag seat and a lower cart frame.

3. The folding joint of a golf bag cart as recited in claim 1, wherein the main body is disposed at a connecting plate for coupling a lower cart frame and a rear wheel stand, and wherein the two rotating members are coupled to an upper cart frame.

4. The folding joint of a golf bag cart as recited in claim 1, wherein the main body includes a pull handle installed inside the main body and disposed at a bottom of the driving block.

5. The folding joint of a golf bag cart as recited in claim 4, wherein the pull handle includes a handle spring installed therein, wherein an end of the handle spring is fixed to the main body, wherein another end of the handle spring is fixed to the pull handle, and an oblique surface is formed at an upper end of the pull handle.

6. The folding joint of a golf bag cart as recited in claim 1, wherein each slide slot further comprises a second latch slot spaced from the first latch slot.

\* \* \* \* \*